W. H. PENNISTON.
Hay-Presses.

No. 155,671.  Patented Oct. 6, 1874.

WITNESSES:  
A. Bennewendorf  
O. Sedgwick

INVENTOR:  
W. H. Penniston  
BY ...  
ATTORNEYS.

UNITED STATES PATENT OFFICE.

WILLIAM H. PENNISTON, OF FOX, MISSOURI.

IMPROVEMENT IN HAY-PRESSES.

Specification forming part of Letters Patent No. 155,671, dated October 6, 1874; application filed August 1, 1874.

*To all whom it may concern:*

Figure 1:
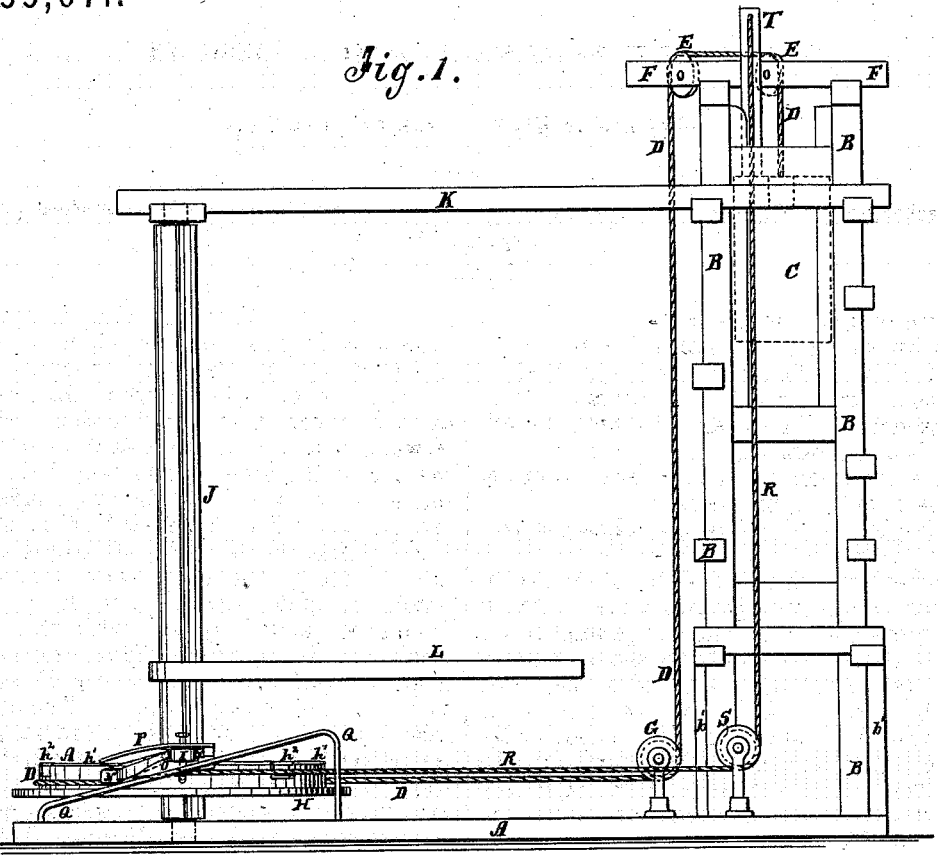
Figure 2:
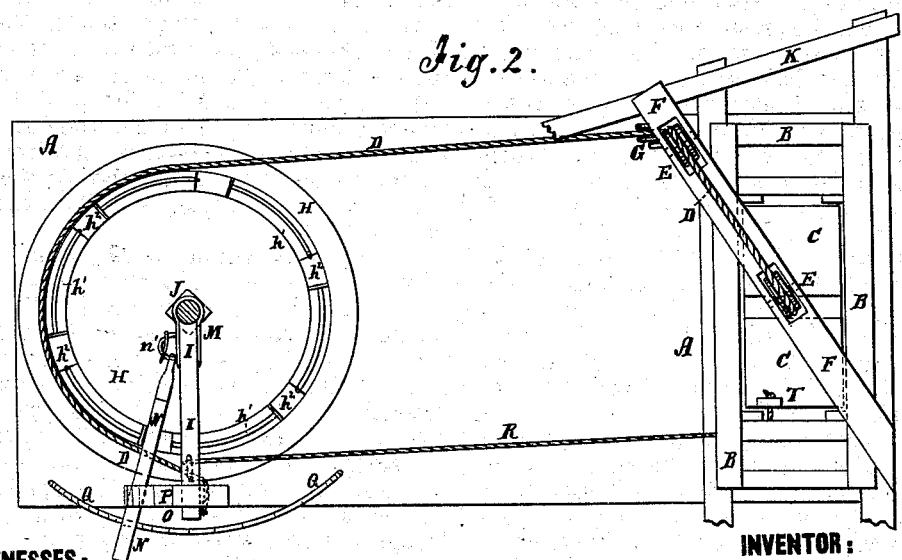

Be it known that I, WILLIAM HENRY PENNISTON, of Fox, in the county of Ray and State of Missouri, have invented a new and useful Improvement in Hay-Press, of which the following is a specification:

Figure 1 is a side view of my improved press. Fig. 2 is a top view of the same.

Similar letters of reference indicate corresponding parts.

My invention has for its object to furnish an improved device for operating the beater in beater-presses so as to make it prompt in its action, and so as to diminish the amount of slack rope when the beater falls, and thus lessen the distance the horse has to travel to again raise the said beater, and consequently to lessen the time required to complete the bale. The invention consists in the construction and combination of parts hereinafter described and claimed.

A represents the base-frame or platform of the press. B is the press-frame, the lower part of which is incased and provided with doors $b'$, to enable the bale to be conveniently removed. C is the beater, which moves up and down upon ways in the frame B. The beater C is raised by the rope D, one end of which is attached to said beater. The rope D passes over guide-pulleys E pivoted to a beam, F, attached to the top of the frame B or to some other convenient support, descends near one corner of the frame B, passes around a guide-pulley, G, pivoted to the base-frame A, passes around the rim of the wheel or drum H, and is secured to the outer part of the arm I. The wheel H is rigidly attached to the sweep-shaft or capstan J, the lower end of which revolves in a step attached to the base-frame A, and its upper end revolves in bearings in a frame, K, attached to the upper part of the frame B or other convenient support. L is the sweep to which the horse is attached, and which is rigidly attached to the shaft J. The inner end of the arm I is connected to the shaft J by a strap or collar, M, so that the said shaft and arm may move independent of each other. To the rear side of the inner part of the arm I is pivoted a second arm, N, which is provided with a stop, $n'$, to prevent it from being thrown too far from the arm I.

The wheel H is provided with an upwardly-projecting ring-flange, $h^1$, in which are formed a number of notches, $h^2$, into which the arm N may drop, so that the wheel H may carry the arm N with it in its revolution. The arm N, when in one of the notches $h^2$, rests against the end of the projection or arm O rigidly attached to the arm I, and the upper side of the outer end of which is beveled off, so that the arm N, when in a notch, $h^2$, may carry the arm I with it, and when raised out of said notch may slide forward upon the projection O and be carried by and with said arm I. The arm N is kept from rising upward when upon the projection O by a stop, P, attached to the arm I or projection O. The arm N is raised out of the notch $h^2$ in the flange $h^1$ of the wheel H by an incline, Q, attached to the base-frame A in proper position to raise the arm N out of its notch when the beater C has been raised to the proper height. The arm I is provided with a projection or friction-roller which rests upon the upper side of the wheel H and prevents the arm I from catching in the notches $h^2$. To the outer part of the arm I is attached the end of the cord R, which passes around the rim of the wheel H, around a guide-pulley, S, pivoted to the base-frame A, and its other end is attached to the end of an upwardly-projecting arm, T, attached to the beater C.

By this construction, as the arms I N are tripped by the incline Q the beater C drops, and the rope D draws the arms I N back. As the beater C reaches the end of its descent the cord R stops the rearward movement of the arm I, so that the horse will not have to travel uselessly to wind up the slack of the rope D before the beater begins to rise. As the arm I is stopped the momentum of the arm N carries it off the projection O until stopped by the stop $n'$, the arm N being left resting upon the flange $h^1$ of the wheel H, ready to drop into the next notch $h^2$ that reaches it.

The pressing-rope is designed to be connected with the upper part of the shaft J, but the pressing device is not shown in the drawing.

Having thus described my invention, I claim as new and desire to secure by Letters Patent—

1. The combination of the capstan or sweep-wheel H, having a flanged and notched outer rim, with the arm I mounted loosely on the sweep-shaft and carrying a pivoted locking-arm, N, operating in connection with the notched wheel H, inclined plane Q, and the beater, as and for the purpose described.

2. In combination with the capstan, wheel, and shaft, the loose arm I carrying a projecting arm, O, stop or retaining plate P, and pivoted locking-bar N, all constructed and operating as herein shown and described.

3. The combination of the cord R and arm T with the beater C and the arm I, to which the hoisting-rope D is attached, substantially as herein shown and described.

WILLIAM H. PENNISTON.

Witnesses:
 WM. T. FRAZER, Sr.,
 JONAH OSBURN.